United States Patent
Miyazaki et al.

(10) Patent No.: US 7,029,416 B2
(45) Date of Patent: Apr. 18, 2006

(54) AUTOMATIC TRANSMISSION

(75) Inventors: Terufumi Miyazaki, Toyota (JP);
Yoshihiro Iijima, Seto (JP); Atsushi Tabata, Okazaki (JP); Yasuo Hojo, Nagoya (JP); Akira Hoshino, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 50 days.

(21) Appl. No.: 10/864,506

(22) Filed: Jun. 10, 2004

(65) Prior Publication Data

US 2004/0242367 A1    Dec. 2, 2004

Related U.S. Application Data

(62) Division of application No. 10/283,284, filed on Oct. 30, 2002, now Pat. No. 6,887,178.

(30) Foreign Application Priority Data

Oct. 30, 2001  (JP)  ............................. 2001-332177

(51) Int. Cl.
*F16H 3/62*    (2006.01)

(52) U.S. Cl. .................................... 475/275

(58) Field of Classification Search ................ 475/275, 475/276
See application file for complete search history.

(56) References Cited

U.S. PATENT DOCUMENTS

| 6,425,841 B1 | 7/2002 | Haka |
| 6,558,287 B1 * | 5/2003 | Hayabuchi et al. ......... 475/271 |
| 6,634,980 B1 | 10/2003 | Ziemer |
| 6,669,597 B1 | 12/2003 | Usoro et al. |
| 6,672,987 B1 * | 1/2004 | Raghavan et al. .......... 476/269 |
| 6,887,178 B1 * | 5/2005 | Miyazaki et al. ........... 475/276 |
| 6,910,985 B1 * | 6/2005 | Ishimaru et al. ............. 475/275 |
| 2002/0142880 A1 | 10/2002 | Hayabuchi et al. |
| 2003/0186775 A1 | 10/2003 | Ishimasu et al. |
| 2003/0232687 A1 | 12/2003 | Bucknor et al. |

FOREIGN PATENT DOCUMENTS

| JP | 8-105496 | 4/1996 |
| JP | 2956173 | 7/1999 |

(Continued)

*Primary Examiner*—Dirk Wright
(74) *Attorney, Agent, or Firm*—Oblon, Spivak, McClelland, Maier & Neustadt, P.C.

(57) ABSTRACT

An automatic transmission includes a first rotating element provided by coupling a sun gear of a second planetary gear set and a carrier of a third planetary gear set to each other, a second rotating element provided by coupling a carrier of the second planetary gear set and a ring gear of the third planetary gear set to each other, a third rotating element provided by a ring gear of the second planetary gear set, and a fourth rotating element provided by a sun gear of the third planetary gear set. The first rotating element and the second rotating element are coupled to a case by first and second brakes, the fourth and first rotating elements are coupled to a ring gear of a first planetary gear set via first and second clutches, the second and first rotating elements are coupled to an input shaft via third and fourth clutches, and the third rotating element is integrally coupled to an output gear, so that the automatic transmission can provide eight forward gear stages by changing a combination of two of the clutches and brakes which are engaged to each other.

10 Claims, 11 Drawing Sheets

| | C1 | C2 | C3 | C4 | B1 | B2 | F1 | GEAR RATIO | STEP |
|---|---|---|---|---|---|---|---|---|---|
| 1st | O | | | | | ◉ | O | 5.04 | 1.69 |
| 2nd | O | | | | | O | | 2.99 | 1.45 |
| 3rd | O | O | | | | | | 2.06 | 1.33 |
| 4th | O | | | O | | | | 1.55 | 1.22 |
| 5th | O | | O | | | | | 1.27 | 1.27 |
| 6th | | | O | O | | | | 1.00 | 1.23 |
| 7th | | O | O | | | | | 0.81 | 1.17 |
| 8th | | | O | | O | | | 0.69 | TOTAL |
| Rev | | O | | | | O | | 4.55 | 7.32 |

FOREIGN PATENT DOCUMENTS

| | | |
|---|---|---|
| JP | 2000-136853 | 5/2000 |
| JP | 2000-136854 | 5/2000 |
| JP | 2000-199549 | 7/2000 |
| JP | 2001-182785 | 7/2000 |
| JP | 2000-266138 | 9/2000 |
| JP | 2000-304110 | 11/2000 |
| JP | 2001-82555 | 3/2001 |
| WO | WO 01/04513 A1 | 1/2001 |
| WO | WO 01/27496 A1 | 4/2001 |
| WO | WO 02/079670 A2 | 10/2002 |

\* cited by examiner

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.04 | 1.69 |
| 2nd | O |  |  |  | O |  |  | 2.99 | 1.45 |
| 3rd | O | O |  |  |  |  |  | 2.06 | 1.33 |
| 4th | O |  |  | O |  |  |  | 1.55 | 1.22 |
| 5th | O |  | O |  |  |  |  | 1.27 | 1.27 |
| 6th |  |  | O | O |  |  |  | 1.00 | 1.23 |
| 7th |  | O | O |  |  |  |  | 0.81 | 1.17 |
| 8th |  |  | O |  | O |  |  | 0.69 | TOTAL 7.32 |
| Rev |  | O |  |  |  | O |  | 4.55 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.014 | 1.669 |
| 2nd | O |  |  |  | O |  |  | 3.005 | 1.502 |
| 3rd | O | O |  |  |  |  |  | 2.000 | 1.334 |
| 4th | O |  |  | O |  |  |  | 1.499 | 1.200 |
| 5th | O |  | O |  |  |  |  | 1.249 | 1.249 |
| 6th |  |  | O | O |  |  |  | 1.000 | 1.250 |
| 7th |  | O | O |  |  |  |  | 0.800 | 1.200 |
| 8th |  |  | O |  |  | O |  | 0.667 | TOTAL 7.521 |
| Rev |  | O |  |  |  | O |  | 4.000 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.453 | 1.713 |
| 2nd | O |  |  | O |  |  |  | 2.599 | 1.645 |
| 3rd | O | O |  |  |  |  |  | 1.580 | 1.227 |
| 4th | O |  |  | O |  |  |  | 1.287 | 1.287 |
| 5th |  |  | O | O |  |  |  | 1.000 | 1.202 |
| 6th |  | O | O |  |  |  |  | 0.832 | 1.290 |
| 7th |  |  | O | O |  |  |  | 0.645 | TOTAL 6.902 |
| Rev |  | O |  |  | O |  |  | 2.873 |  |

|      | C1 | C2 | C3 | C4 | B1 | B2 | F1 | GEAR RATIO | STEP |
|------|----|----|----|----|----|----|----|------------|------|
| 1st  | O  |    |    |    |    | ◎  | O  | 4.453      |      |
| 2nd  | O  |    |    |    | O  |    |    | 2.599      | 1.713 |
| 3rd  | O  | O  |    |    |    |    |    | 1.580      | 1.645 |
| 4th  | O  |    |    | O  |    |    |    | 1.287      | 1.227 |
| 5th  |    |    | O  | O  |    |    |    | 1.000      | 1.287 |
| 6th  |    | O  | O  |    |    |    |    | 0.832      | 1.202 |
| 7th  |    |    | O  |    | O  |    |    | 0.645      | 1.290 |
| Rev  |    | O  |    |    |    | O  |    | 2.873      | TOTAL 6.902 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.453 | 1.713 |
| 2nd | O |  |  |  | O |  |  | 2.599 | 1.645 |
| 3rd | O | O |  |  |  |  |  | 1.580 | 1.227 |
| 4th | O |  |  | O |  |  |  | 1.287 | 1.287 |
| 5th |  |  | O | O |  |  |  | 1.000 | 1.202 |
| 6th |  | O | O |  |  |  |  | 0.832 | 1.290 |
| 7th |  |  | O |  | O |  |  | 0.645 | TOTAL |
| Rev |  | O |  |  |  | O |  | 2.873 | 6.902 |

AUTOMATIC TRANSMISSION

INCORPORATION BY REFERENCE

The disclosure of Japanese Patent Application No. 2001-332177 filed on Oct. 30, 2001, including the specification, drawings and abstract is incorporated herein by reference in its entirety. Additionally, the present application is a division of U.S. patent application Ser. No. 10/283,284, filed on Oct. 30, 2002 now U.S. Pat. No. 6,887,178, which is hereby incorporated by reference in its entirety.

BACKGROUND OF THE INVENTION

1. Field of Invention

The invention relates to an automatic transmission, and more particularly to an automatic transmission capable of providing seven or more forward gear stages or speeds by using three planetary gear sets and also capable of shifting from one gear stage to another gear stage by changing a combination of two different engaging elements, such as clutches and brakes, to be engaged.

2. Description of Related Art

Automatic transmissions of motor vehicles, each including a plurality of planetary gear sets, clutches and brakes, have been widely used. Japanese Laid-Open Patent Publication No. 2000-266138 (JP-A-2000-266138) discloses an example of such an automatic transmission which is able to provide seven forward gear stages by using four planetary gear sets. Also, Japanese Laid-Open Patent Publication No. 2001-82555 (JP-A-2001-82555) discloses another example of the automatic transmission which is able to provide ten forward gear stages by using three planetary gear sets.

The automatic transmission as disclosed in JP-A-2000-266138, which uses four planetary gear sets, has a relatively large axial length, and may suffer from a difficulty in installing the transmission on the vehicle, an increased weight, and an increased manufacturing cost. On the other hand, the automatic transmission as disclosed in JP-A-2001-82555 can be comparatively easily installed on the vehicle. However, there is a need to change a combination of the maximum of four engaging elements (clutches and/or brakes) to be engaged so as to shift the transmission from one speed to another speed. Thus, the automatic transmission requires complicated, high-accuracy shift control, and may suffer from shift shocks.

SUMMARY OF THE INVENTION

In view of the above situation, the invention has been made to provide an automatic transmission constructed as described below.

An automatic transmission according to one aspect of the invention includes (a) a first transmitting portion including an input member that is rotated at reduced speed to output power from an intermediate output member, and (b) a second transmitting portion including a second planetary gear set and a third planetary gear set each of which includes a sun gear, a carrier and a ring gear, at least one of the sun gear, the carrier and the ring gear of the second planetary gear set being coupled to at least one of the sun gear, the carrier and the ring gear of the third planetary gear set to provide a first rotating element, a second rotating element, a third rotating element and a fourth rotating element, which are arranged in the order of description from one end to the other end in a nomogram in which speeds of rotation of the first, second, third and fourth rotating elements are represented by straight lines. The second transmitting portion further includes a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the first rotating elements to the input member, the third rotating element being integrally coupled to an output member to output rotary power. In the automatic transmission thus constructed, a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, and a fourth-speed gear stage having a smaller gear ratio than that of the third-speed gear stage is established when the first clutch and the fourth clutch are engaged, a fifth-speed gear stage having a smaller gear ratio than that of the fourth-speed gear stage is established when the first clutch and the third clutch are engaged, a sixth-speed gear stage having a smaller gear ratio than that of the fifth-speed gear stage is established when the third clutch and the fourth clutch are engaged, a seventh-speed gear stage having a smaller gear ratio than that of the sixth-speed gear stage is established when the second clutch and the third clutch are engaged, an eighth-speed gear stage having a smaller gear ratio than that of the seventh-speed gear stage is established when the third clutch and the first brake are engaged.

The gear ratio as mentioned above means the ratio of the speed of rotation of the input member to the speed of rotation of the output member (=rotation speed of input member/rotation speed of output member).

With the automatic transmission constructed as described above, the eight forward speeds are provided by the first transmitting portion, the second transmitting portion mainly including two planetary gear sets, four clutches and two brakes. Thus, the automatic transmission is made lightweight and compact, as compared with the case where four planetary gear sets are used. Furthermore, since shifting from one speed to another speed is effected only by changing the combination of two engaging elements (clutches and/or brakes), shift control can be easily performed, and shift shocks are advantageously reduced.

According to another aspect of the invention, there is provided an automatic transmission which includes (a) a first transmitting portion including an input member that is rotated at reduced speed to output power from an intermediate output member, and (b) a second transmitting portion including a second planetary gear set and a third planetary gear set each of which includes a sun gear, a carrier and a ring gear, at least one of the sun gear, the carrier and the ring gear of the second planetary gear set being coupled to at least one of the sun gear, the carrier and the ring gear of the third planetary gear set to provide a first rotating element, a second rotating element, a third rotating element and a fourth rotating element, which are arranged in the order of description from one end to the other end in a nomogram in which speeds of rotation of the first, second, third and fourth rotating elements are represented by straight lines. The second transmitting portion further includes a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the first rotating elements to the input member, the third rotating element being integrally coupled to an output member to output rotary power. In the automatic transmission thus constructed, a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, and a fourth-speed gear stage having a smaller gear ratio than that of the third-speed gear stage is established when the first clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, a seventh-speed gear stage having a smaller gear ratio than that of the sixth-speed gear stage is established when the third clutch and the first brake are engaged.

With the automatic transmission constructed as described above, the seven forward speeds are provided by the first transmitting portion, the second transmitting portion mainly including two planetary gear sets, four clutches and two brakes. Thus, the automatic transmission is made lightweight and compact, as compared with the case where four planetary gear sets are used. Furthermore, since shifting from one speed to another speed is effected only by changing the combination of two engaging elements (clutches and/or brakes), shift control can be easily performed, and shift shocks are advantageously reduced.

BRIEF DESCRIPTION OF THE DRAWINGS

The above-mentioned exemplary embodiment and other exemplary embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF PREFERRED EMBODIMENTS

Figures 1A, 1B:
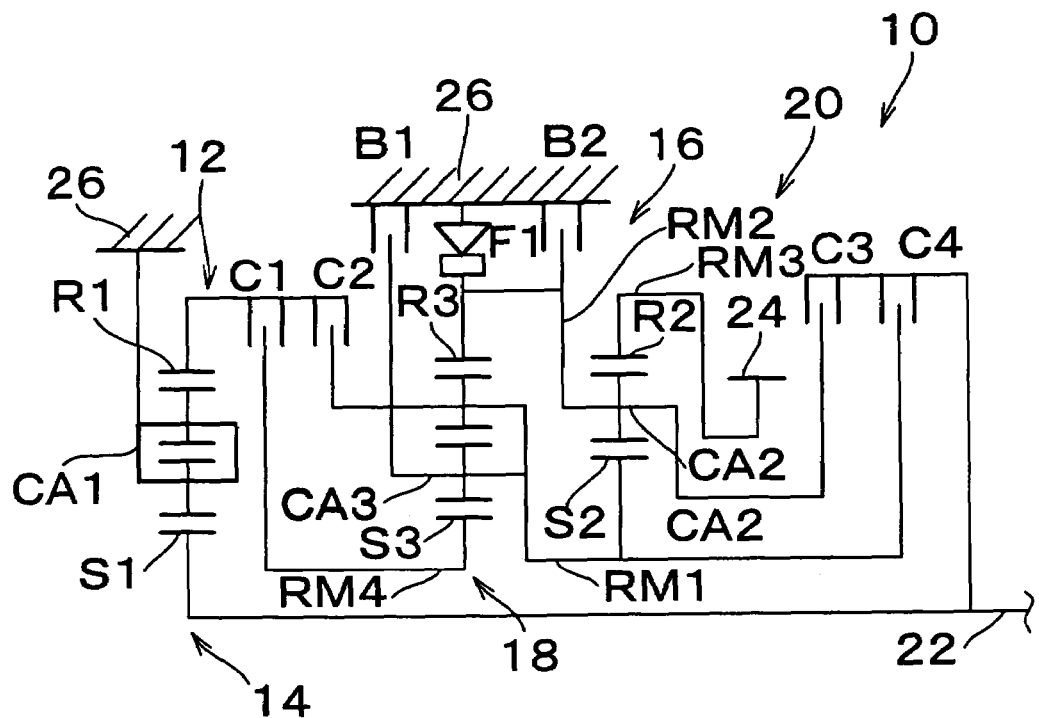
FIG. 1a is a schematic view showing an automatic transmission of a motor vehicle according to a first embodiment of the invention.
FIG. 1b is an operation table according to which each gear stage of the automatic transmission of the first embodiment as shown in FIG. 1a is established.

In the following description and the accompanying drawings, the invention will be described in more detail with reference to exemplary embodiments.

The invention is preferably applied to an automatic transmission of a motor vehicle, which receives rotary power from a driving power source, such as an internal combustion engine, via a fluid coupling such as a torque converter, changes the speed of rotation at a given gear ratio, and transmits the power from an output member, such as an output gear or an output shaft, to right and left driving wheels, via a differential gear unit. An input member of the transmission may be a turbine shaft of the torque converter. It is to be understood that the invention may also be applied to automatic transmissions for use in systems other than motor vehicles.

The automatic transmission may be transversely or laterally installed on, for example, a front engine front drive (FF) vehicle, such that the axis of the transmission extends in the width direction of the vehicle, or may be longitudinally installed on, for example, a front engine rear drive (FR) vehicle, such that the axis of the transmission extends in the longitudinal or running direction of the vehicle.

The automatic transmission may automatically change its gear ratio depending upon vehicle operating conditions, such as an accelerator pedal position and a vehicle speed, or may change its gear ratio in accordance with manual shifting operations (e.g., upshifting and downshifting operations) by the vehicle operator. The automatic transmission according to exemplary embodiments of the invention is able to establish seven or eight forward gear stages, and also establish a reverse gear stage by engaging a second clutch and a second brake (which will be described later) provided in the automatic transmission and a high-speed reverse gear having a small gear ratio by engaging a forth clutch (which will be described later) and the second brake.

The first through fourth clutches and the first and second brakes as described later may preferably be in the form of hydraulically operated friction devices of, for example, multiple-disc type, single-disc type or belt type, which are frictionally engaged by means of hydraulic cylinders. Other coupling devices, such as those of electromagnetic type, may also be used as the clutches and brakes. A one-way clutch or clutches may also be provided in parallel with the above-indicated clutches and brakes so as to make shift control easy. If a one-way clutch is provided in parallel with the second clutch, for example, the transmission establishes the $1^{st}$-speed gear stage only by engaging the first clutch. Furthermore, the transmission can shift from the $1^{st}$-speed gear stage to the $2^{nd}$-speed gear stage only by engaging the first brake. When an engine brake is not needed, a one-way clutch may be provided in place of the second brake. Here, one-way clutches function, like brakes, to stop rotation of corresponding rotating members. Other than the above-described arrangements, the automatic transmission of the invention may be constructed in various ways. For example, a brake and a one-way clutch, which are connected in series, may be provided in parallel with the first brake.

Referring to attached figures, the first embodiment of the invention will hereinafter be described in detail.

First Embodiment

FIG. 1a schematically shows an automatic transmission 10 of a motor vehicle according to the first embodiment of the invention, and FIG. 1b is an operation table useful for explaining the relationship between engaging elements and gear ratios when a plurality of gear stages are established. The automatic transmission 10 is mounted in the lateral direction in a vehicle, such as a FF vehicle, and includes a sub-transmitting portion 14 and a main transmitting portion 20. The sub-transmitting portion 14 mainly includes a first planetary gear set 12 of a double-pinion type, and the main transmitting portion 20 mainly includes a second planetary gear set 16 of a single-pinion type and a third planetary gear set 18 of a double-pinion type. The automatic transmission 10 thus constructed transmits rotary power from an input shaft 22 to an output gear 24 while changing the speed of rotation. The sub-transmitting portion 14 is the first transmitting portion whereas the main transmitting portion 20 is the second transmitting portion. The input shaft 22, which corresponds to the above-indicated input member, is a turbine shaft of a torque converter which is rotated by a driving power source such as an internal combustion engine. The output gear 24, which corresponds to the above-indicated output member, drives or rotates right and left driving wheels via a differential gear unit and drive shafts. It is to be noted that the automatic transmission 10 is constructed substantially symmetrically with respect to the center line, and only the upper half of the transmission 10 is illustrated in FIG. 1a.

The first planetary gear set 12 that constitutes the sub-transmitting portion 14 has a sun gear S1, a carrier CA1 and a ring gear R1. The sun gear S1 is coupled to and driven (i.e., rotated) by the input shaft 22, and the carrier CA1 is fixed integrally to a transmission case 26 and is thus inhibited from rotating, while the ring gear R1, as an intermediate output member, is rotated at a reduced speed as compared with that of the input shaft 22, to output power to the main transmitting portion 20. Each of the second and third planetary gear sets 16, 18 that constitute the main transmitting portion 20 has a sun gear S2, S3, a carrier CA2, CA3 and a ring gear R2, R3. The second and third planetary gear sets 16, 18 provide four rotating elements RM1-RM4 by connecting parts of the gear sets 16, 18 with each other. More specifically, the sun gear S2 of the second planetary gear set 16 and the carrier CA3 of the third planetary gear set 18 are coupled to each other to provide the first rotating element RM1, and the carrier CA2 of the second planetary gear set 16 and the ring gear R3 of the third planetary gear set 18 are coupled to each other to provide the second rotating element RM2. The ring gear R2 of the second planetary gear set 16 provides the third rotating element RM3, and the sun gear S3 of the third planetary gear set 18 provides the fourth rotating element RM4.

The first rotating element RM1 (i.e., sun gear S2, carrier CA3) is selectively coupled to the case 26 by a first brake B1 so that its rotation is stopped, and the second rotating element RM2 (i.e., carrier CA2, ring gear R3) is selectively coupled to the case 26 by a second brake B2 so that its rotation is stopped. The fourth rotating element RM4 (i.e., sun gear S3) is selectively coupled via a first clutch C1 to the ring gear R1 of the first planetary gear set 12 as the intermediate output member, and the first rotating element RM1 (i.e., sun gear S2, carrier CA3) is selectively coupled via a second clutch C2 to the ring gear R1, while the second rotating element RM2 (i.e., carrier CA2, ring gear R3) is selectively coupled to the input shaft 22 via a third clutch C3. The first rotating element RM1 (i.e., sun gear S2, carrier CA3) is selectively coupled to the input shaft 22 via a fourth clutch C4. The third rotating element RM3 (i.e., ring gear R2) is coupled integrally to the output gear 24 so as to output rotary power. Each of the first brake B1, second brake B2 and the first through fourth clutches C1–C4 is a hydraulically operated friction device of a multiple-disc type, which is frictionally engaged by means of a hydraulic cylinder. In addition, a one-way clutch F1 is disposed in parallel with the second brake B2, between the second rotating element RM2 (i.e., carrier CA2, ring gear R3) and the case 26. The one-way clutch F1 is adapted to allow the second rotating element RM2 to rotate in the same direction as the input shaft 22, but inhibit the same element RM2 from rotating in the reverse direction.

Figure 2:
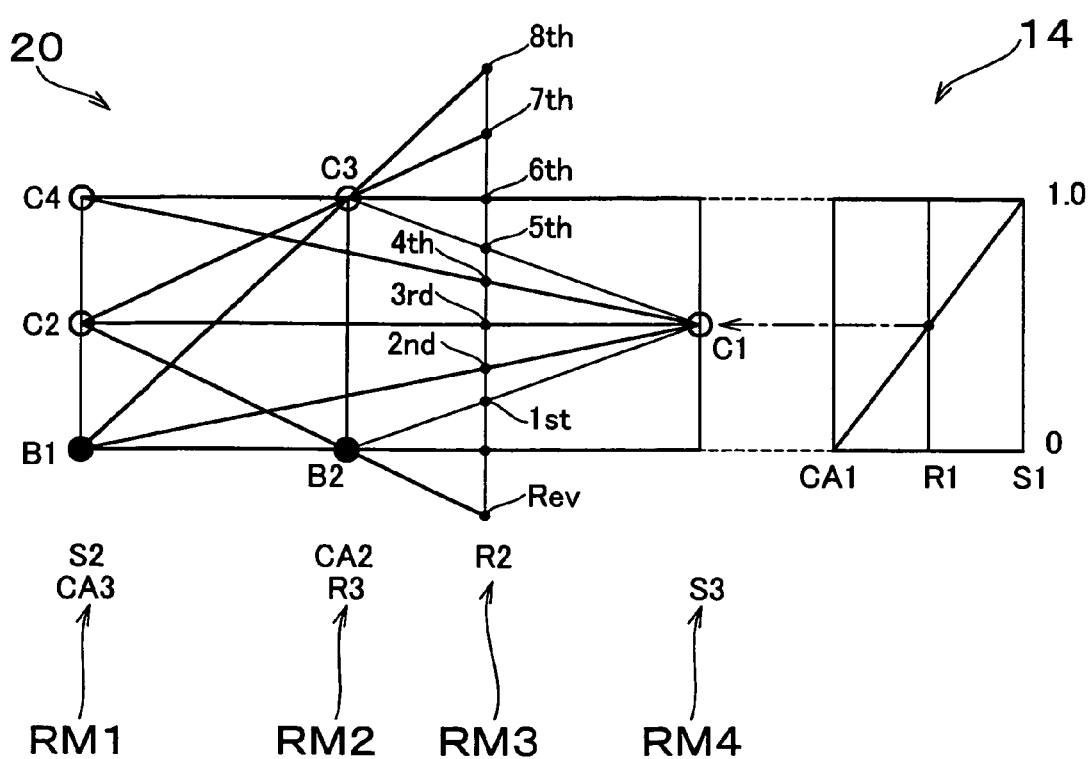
FIG. 2 is a nomogram plotted with respect to the automatic transmission of the first embodiment of the invention.

FIG. 2 is a nomogram in which straight lines represent the speeds of rotation of the respective rotating elements of the sub-transmitting portion 14 and the main transmitting portion 20. In the nomogram of FIG. 2, the lower horizontal line indicates rotation speed "0", and the upper horizontal line indicates rotation speed "1.0" which is equal to the rotation speed of the input shaft 22. Three vertical lines in the section of the sub-transmitting portion 14 respectively represent the carrier CA1, the ring gear R1 and the sun gear S1 as viewed from the left to the right in FIG. 2. The intervals of these vertical lines are determined in accordance with the gear ratio $\rho 1$ (=the number of teeth of the sun gear/the number of teeth of the ring gear) of the first planetary gear set 12. Four vertical lines in the section of the main transmitting portion 20 respectively represent the first rotating element RM1 (sun gear S2, carrier CA3), the second rotating element RM2 (carrier CA2, ring gear R3), the third rotating element RM3 (ring gear R2) and the fourth rotating element RM4 (sun gear S3) as viewed from the left to the right in FIG. 2. The intervals of these vertical lines are determined in accordance with the gear ratio ρ2 of the second planetary gear set 16 and the gear ratio ρ3 of the third planetary gear set 18.

As is apparent from the nomogram of FIG. 2, when the first clutch C1 and the second brake B2 are engaged, and the fourth rotating element RM4 is rotated at a reduced speed via the sub-transmitting portion 14 while rotation of the second rotating element RM2 is stopped, the third rotating element RM3 coupled to the output gear 24 is rotated at a speed denoted by "$1^{st}$" in FIG. 2, so that the $1^{st}$-speed gear stage having the largest gear ratio is established.

When the first clutch C1 and the first brake B1 are engaged, and the fourth rotating element RM4 is rotated at a reduced speed via the sub-transmitting portion 14 while rotation of the first rotating element RM1 is stopped, the third rotating element RM3 is rotated at a speed denoted by "$2^{nd}$" in FIG. 2, so that the $2^{nd}$-speed gear stage having a smaller gear ratio than that of the $1^{st}$-speed gear stage is established.

When the first clutch C1 and the second clutch C2 are engaged, and the main transmitting portion 20 is rotated as a unit at a reduced speed via the sub-transmitting portion 14, the third rotating element RM3 is rotated at a speed denoted by "$3^{rd}$" in FIG. 2, which is equal to the rotation speed of the ring gear R1 of the sub-transmitting portion 14, so that the $3^{rd}$-speed gear stage having a smaller gear ratio than that of the $2^{nd}$-speed gear stage is established.

When the first clutch C1 and the fourth clutch C4 are engaged, and the fourth rotating element RM4 is rotated at a reduced speed via the sub-transmitting portion 14 while the first rotating element RM1 is rotated as a unit with the input shaft 22, the third rotating element RM3 is rotated at a speed denoted by "$4^{th}$" in FIG. 2, so that the $4^{th}$-speed gear stage having a smaller gear ratio than that of the $3^{rd}$-speed gear stage is established.

When the first clutch C1 and the third clutch C3 are engaged, and the fourth rotating element RM4 is rotated at a reduced speed via the sub-transmitting portion 14 while the second rotating element RM2 is rotated as a unit with the input shaft 22, the third rotating element RM3 is rotated at a speed denoted by "$5^{th}$" in FIG. 2, so that the $5^{th}$-speed gear stage having a smaller gear ratio than that of the $4^{th}$-speed gear stage is established.

When the third clutch C3 and the fourth clutch C4 are engaged, and the main transmitting portion 20 is rotated as a unit with the input shaft 22, the third rotating element RM3 is rotated at a speed denoted by "$6^{th}$" in FIG. 2, which is equal to the rotation speed of the input shaft 22, so that the $6^{th}$-speed gear stage having a smaller gear ratio than that of the $5^{th}$-speed gear stage is established. Meanwhile, the gear ratio of the $6^{th}$-speed gear stage is 1.

When the second clutch C2 and the third clutch C3 are engaged, and the first rotating element RM1 is reduced at a reduced speed via the sub-transmitting portion 14 while the second rotating element RM2 is rotated as a unit with the input shaft 22, the third rotating element RM3 is rotated at a speed denoted by "$7^{th}$" in FIG. 2, so that the $7^{th}$-speed gear stage having a smaller gear ratio than that of the $6^{th}$-speed gear stage is established.

When the third clutch C3 and the first brake B1 are engaged, and the second rotating element RM2 is rotated as a unit with the input shaft 22 while rotation of the first rotating element RM1 is stopped, the third rotating element RM3 is rotated at a speed denoted by "$8^{th}$" in FIG. 2, so that the $8^{th}$-speed gear stage having a smaller gear ratio than that of the $7^{th}$-speed gear stage is established.

When the second clutch C2 and the second brake B2 are engaged, the first rotating element RM1 is rotated at a reduced speed via the sub-transmitting portion 14, and rotation of the second rotating element RM2 is stopped. As a result, the third rotating element RM3 is rotated in the reverse direction at a speed denoted by "Rev" in FIG. 2, so that a reverse gear stage "Rev" is established. Further, when the fourth clutch C4 and the second brake B2 are engaged, the first rotating element RM1 is rotated as a unit with the input shaft 22 and rotation of the second rotating element RM2 is stopped. As s result, the third rotating element RM3 is rotated in the reverse direction at a higher speed than that denoted by "Rev" in FIG. 2, so that a second reverse gear stage having a small gear ratio than that of the reverse gear ratio "Rev", namely which is a high-speed reverse gear, is established.

The operation table of FIG. 1b indicate the relationship between the respective gear stages and the operating states of the clutches C1–C4 and the brakes B1, B2. In FIG. 1b, "○" indicates engagement, and "502" indicates engagement only at the time of application of an engine brake. Since the one-way clutch F1 is provided in parallel with the second brake B2 for establishing the $1^{st}$-speed gear stage, the second brake B2 is not necessarily engaged when the vehicle is started (or accelerated). The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.485, ρ2 is equal to 0.453, and ρ3 is equal to 0.475, the gear ratios as indicated in FIG. 1b are provided. As is understood from FIG. 1b, the step value of the gear ratios, namely, the ratio of the gear ratios of the adjacent gear stages is generally appropriate, and the total width of the gear ratios, namely, the ratio of the largest gear ratio to the smallest gear ratio (=5.04/0.69), is a sufficiently large value (which is about 7.32). In addition, the reverse gear stage "Rev" has an appropriate gear ratio. Thus, the automatic transmission 10 provides appropriate speed-change characteristics over the entire range of operation.

With the automatic transmission 10 of the embodiment, the eight forward speeds (or forward-drive gear stages) are provided by three planetary gear sets 12, 16, 18, four clutches C1–C4 and two brakes B1, B2. Thus, the automatic transmission 10 is made light-weight and compact, and can be more easily installed on the vehicle, as compared with the case where four planetary gear sets are used. Furthermore, since shifting from one speed to another speed is effected only by changing the combination of two of the clutches C1–C4 and the brakes B1, B2, shift control can be easily performed, and shift shocks are advantageously reduced.

When the gear ratios ρ1, ρ2 and ρ3 of the three planetary gear sets 12, 16 and 18 are respectively set within a range of about 0.3 to 0.6, the automatic transmission 10 is able to provide appropriate speed-change characteristics over the entire range of operation as shown in FIG. 1b while keeping the size (or diameter) of the planetary gear sets 12, 16, 18 relatively small.

Next, a modified example of the first embodiment will be explained. In the following description of the modified example, the same reference numerals will be used to identify substantially the same elements or portions as those of the first embodiment.

Figure 3:
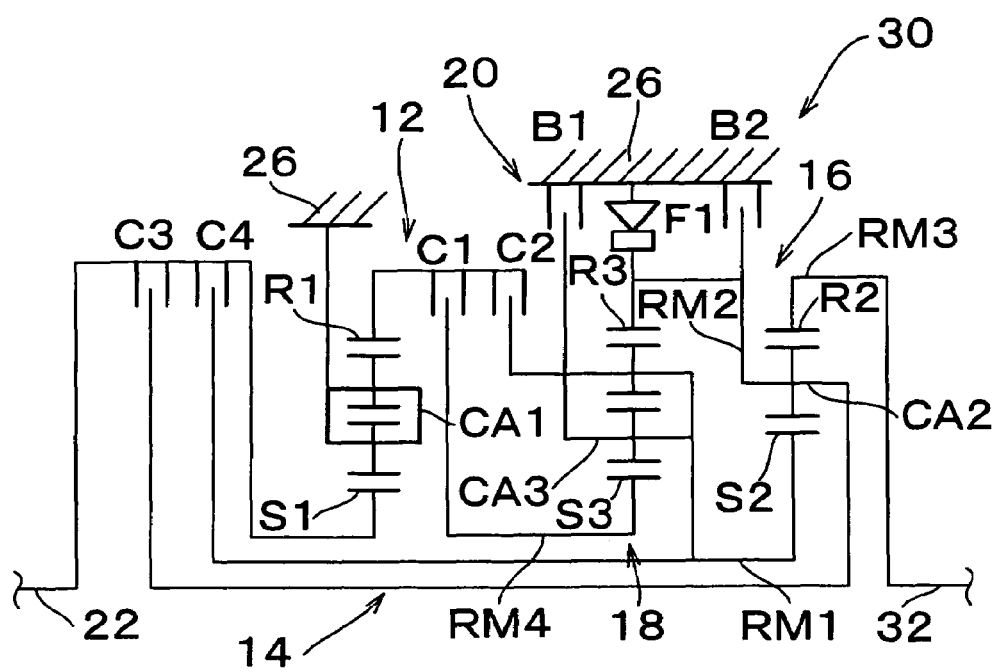
FIG. 3 is a schematic view showing a modified example of the automatic transmission of a motor vehicle according to the first embodiment of the invention.

The automatic transmission 30 shown in FIG. 3 is modified from the transmission 10 so as to be installed on a FR vehicle (so as to be installed in the longitudinal direction of the vehicle). In the automatic transmission 30, the third clutch C3 and the fourth clutch C4 are disposed in a side opposite toward the sub-transmitting portion 14, namely in the front side of the vehicle, while the third rotating element RM3, namely the ring gear R2 of the second planetary gear set 16, is integrally coupled to an output shaft 32, as the above-indicated output member, which drives or rotates drive wheels via a propeller shaft and a differential gear unit.

Second Embodiment

Figures 4A, 4B:
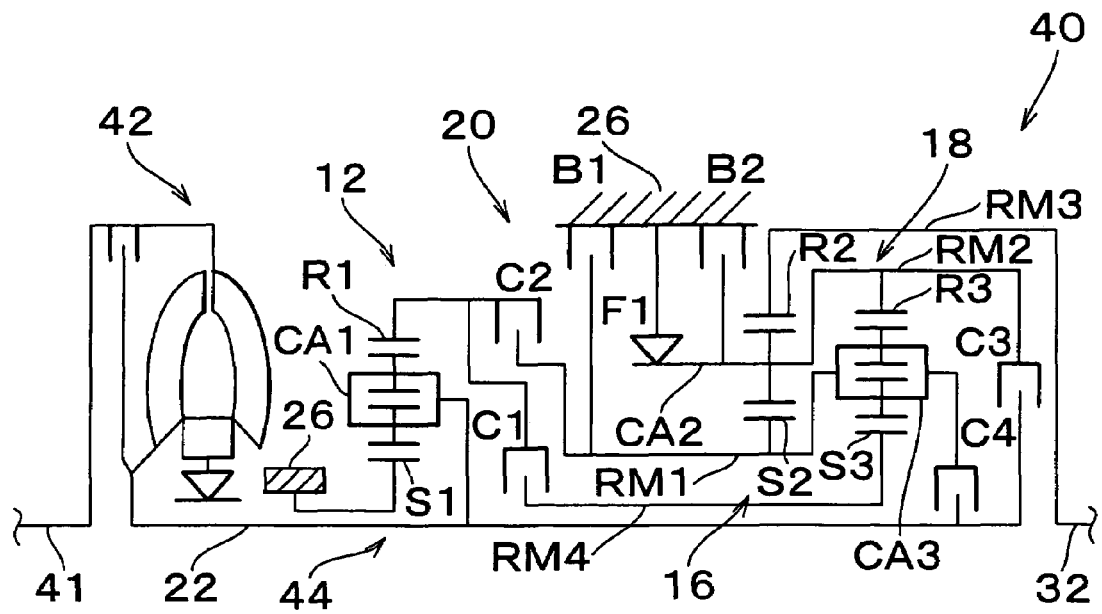
FIG. 4a is a schematic view showing an automatic transmission of a motor vehicle according to a second embodiment of the invention.
FIG. 4b is an operation table according to which each gear stage of the automatic transmission of the second embodiment is established.
Figure 5:
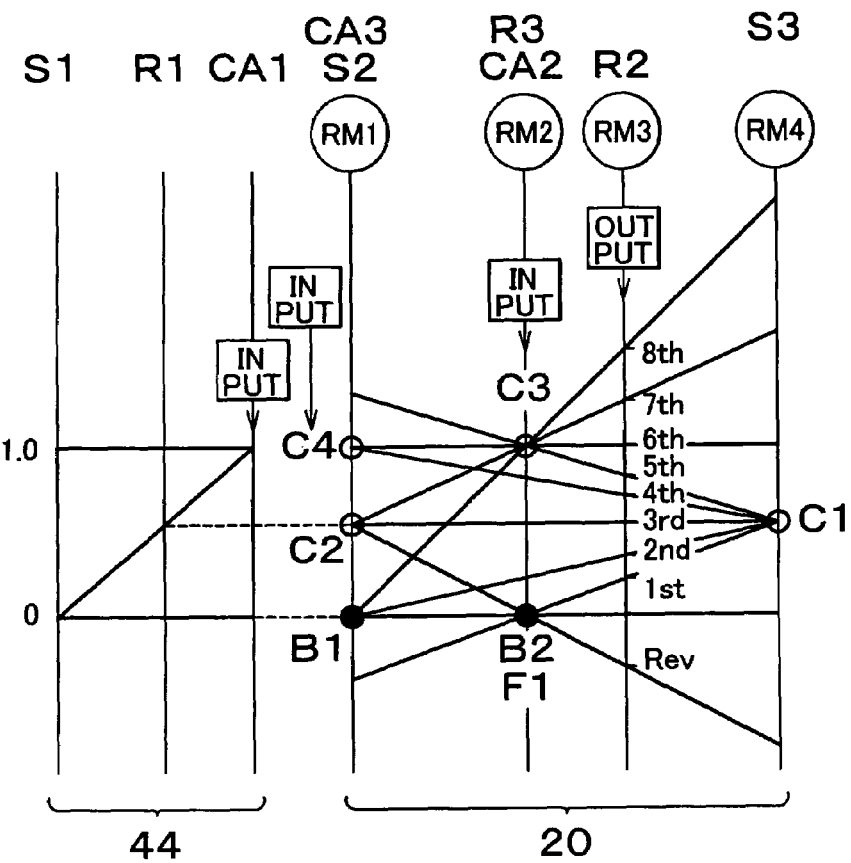
FIG. 5 is a nomogram plotted with respect to the automatic transmission of the second embodiment.

FIG. 4a is a schematic vehicle showing an automatic transmission 40 of a motor vehicle according to the second embodiment of the invention. FIG. 4b is an operation table useful for explaining the relationship between engaging elements and gear ratios when a plurality of gear stages are established. FIGS. 1a, 1b, and 5 correspond to FIGS. 1a, 1b, and 2, respectively.

The automatic transmission 40 is to be installed on in the longitudinal direction of a vehicle such as a FR vehicle. With the automatic transmission 40, rotary power is transmitted from an internal combustion engine as a driving power source to the input shaft 22 via a torque converter 42, and is output from the output shaft 32 to the driving wheels via the propeller shaft and so on. The main transmitting portion 20 has substantially the same construction as the automatic transmission of the above-described first embodiment, but positions of the second planetary gear set 16 and the third planetary gear set 18 are interchanged. In the sub-transmitting portion 44, the carrier CA1 of the first planetary gear set 12 of a double pinion type is coupled to and rotated by the input shaft 22, and the sun gear S1 is fixed to the case 26 and is thus inhibited from rotating, while the ring gear R1, serving as an intermediate output member, is rotated at a reduced speed as compared with that of the input shaft 22, to output power to the main transmitting portion 20 via a selected one of the clutches C1 and C2.

In this case, too, eight forward gear stages, i.e., the $1^{st}$-speed gear stage through the $8^{th}$-speed gear stage, and one reverse gear stage "Rev" are established according to the operation table of FIG. 4b that is identical with that of FIG. 1b. The transmission gear ratios of the respective gear stages are suitably determined depending upon the respective gear ratios $\rho 1$, $\rho 2$ and $\rho 3$ of the first, second and third planetary gear sets 12, 16 and 18. For example, if $\rho 1$ is equal to 0.500, $\rho 2$ is equal to 0.500, and $\rho 3$ is equal to 0.444, the gear ratios as indicated in FIG. 4b are provided, where the step value of the gear ratios is generally appropriate and the total width of the gear ratios (=5.014/0.667) is a sufficiently large value (which is about 7.521). Thus, the automatic transmission 40 of the second embodiment operates in substantially the same manner and yields substantially the same effects as that of the first embodiment.

Figure 6:
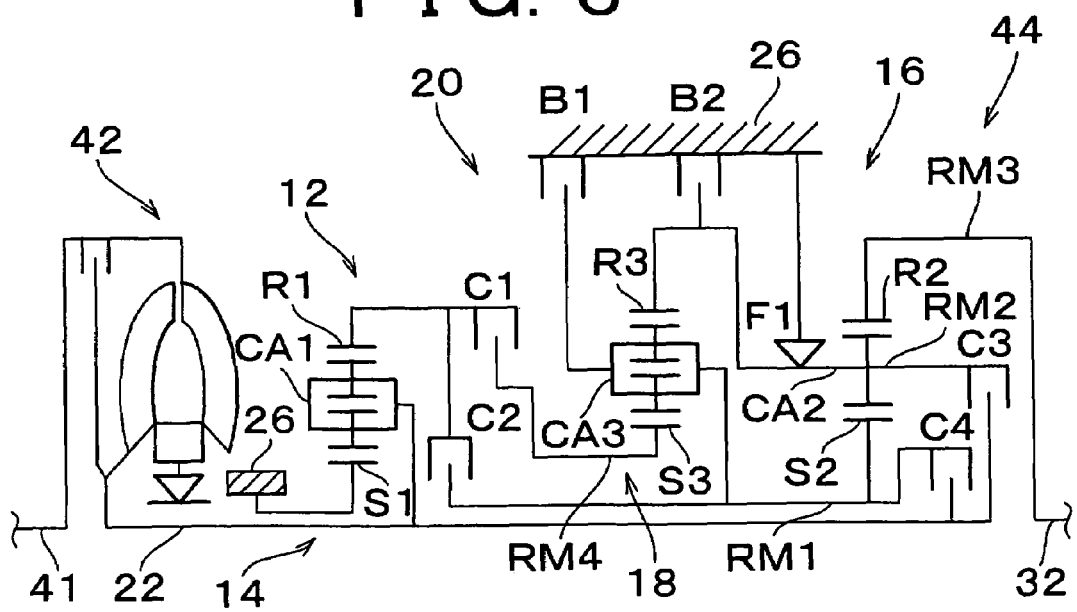
FIG. 6 is a schematic view showing a modified example of the automatic transmission of a motor vehicle according to the second embodiment of the invention.

Besides, FIG. 6 shows an automatic transmission 44 of a motor vehicle as a modified example of the automatic transmission 40 of the second embodiment. In the automatic transmission 44, positions of the second planetary gear set 16 and the third planetary gear set 18 of the main transmitting portion 20 are interchanged.

Third Embodiment

Figures 7A, 7B:
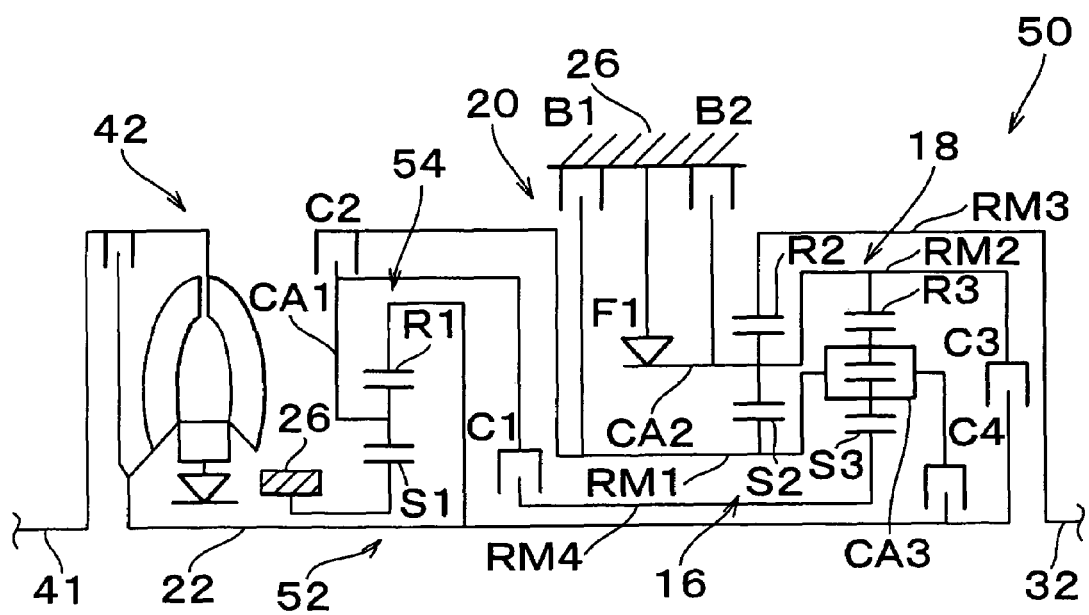
FIG. 7a is a schematic view showing an automatic transmission of a motor vehicle according to a third embodiment of the invention.
FIG. 7b is an operation table according to which each gear stage of the automatic transmission of the third embodiment is established.
Figure 8:
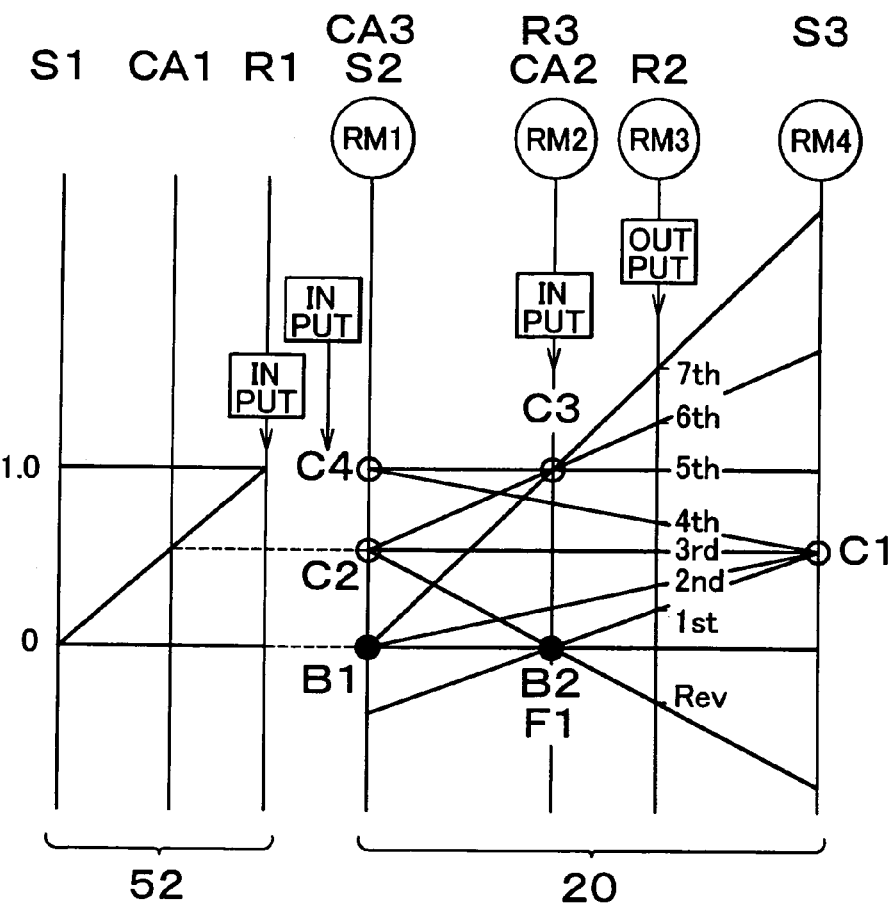
FIG. 8 is a nomogram plotted with respect to the automatic transmission of the third embodiment.

FIG. 7a is a schematic view showing an automatic transmission 50 of a motor vehicle according to the third embodiment of the invention. FIG. 7b is an operation table useful for explaining the relationship between engaging elements and gear ratios when a plurality of gear stages are established. FIGS. 7a, 7b, and 8 correspond to FIGS. 1a, 1b, and 2, respectively.

The automatic transmission 50 is different from the automatic transmission 40 shown in FIG. 5 in respect of the construction of the sub-transmitting portion 52. More specifically, the sub-transmitting portion 52 of the automatic transmission 50 mainly includes the first planetary gear set 54 of a single pinion type, in which the ring gear R1 is coupled to and rotated by the input shaft 22, and the sun gear S1 is fixed to the case 26 and is thus inhibited from rotating, while the carrier CA1, serving as an intermediate output member, is rotated at a reduced speed as compared with that of the input shaft 22, to output power to the main transmitting portion 20 via the clutch C1 and/or the clutch C2.

With the automatic transmission 50 of the embodiment, like the automatic transmission 40 shown in FIGS. 4a and 4b, the main transmitting portion 20 includes three planetary gear sets 54, 16, 18, four clutches C1–C4 and two brakes B1, B2, but is able to establish seven forward speeds (or forward-drive gear stages) as indicated in FIGS. 7b and 8. More specifically, when the first clutch C1 and the second brake B2 are engaged to each other and the fourth rotating element RM4 is rotated at a reduced speed via the sub-transmitting portion 52 while rotation of the second rotating element RM2 is stopped, the third rotating element RM3 coupled to the output shaft 32 is rotated at a speed denoted by "$1^{st}$" so that the $1^{st}$-speed gear stage having the largest gear ratio is established.

When the first clutch C1 and the first brake B1 are engaged to each other and the fourth rotating element RM4 is rotated at a reduced speed via the sub-transmitting portion 52 while rotation of the first rotating element RM1 is stopped, the third rotating element RM3 coupled to the output shaft 32 is rotated at a speed denoted by "$2^{nd}$", so that the $2^{nd}$-speed gear stage having a larger gear ratio than that of the $1^{st}$-speed gear stage is established.

When the first clutch C1 and the second clutch C2 are engaged to each other and the main transmitting portion 20 is rotated as a unit at a reduced speed via the sub-transmitting portion 52, the third rotating element RM3 coupled to the output shaft 32 is rotated at a speed denoted by "$3^{rd}$", which is equal to the rotation speed of the carrier CA1 of the sub-transmitting portion 52, so that the $3^{rd}$-speed gear stage having a larger gear ratio than that of the $2^{nd}$-speed gear stage is established.

When the first clutch C1 and the fourth clutch C4 are engaged, and the fourth rotating element RM4 is rotated at a reduced speed via the sub-transmitting portion 52 while the first rotating element RM1 is rotated as a unit with the input shaft 22, the third rotating element RM3 is rotated at a speed denoted by "$4^{th}$", so that the $4^{th}$-speed gear stage having a smaller gear ratio than that of the $3^{rd}$-speed gear stage is established.

When the third clutch C3 and the fourth clutch C4 are engaged, and the main transmitting portion 20 is rotated as a unit with the input shaft 22, the third rotating element RM3 is rotated at a speed denoted by "$5^{th}$", which is equal to the rotation speed of the input shaft 22, so that the $5^{th}$-speed gear stage having a smaller gear ratio than that of the $4^{th}$-speed gear stage is established. Meanwhile, the gear ratio of the $5^{th}$-speed gear stage is 1.

When the second clutch C2 and the third clutch C3 are engaged, and the first rotating element RM1 is rotated as at a reduced speed via the sub-transmitting portion 52, while the second rotating element RM2 is rotated as a unit with the input shaft 22, the third rotating element RM3 is rotated at a speed denoted by "$6^{th}$", so that the $6^{th}$-speed gear stage having a smaller gear ratio than that of the $5^{th}$-speed gear stage is established.

When the third clutch C3 and the first brake B1 are engaged, and the second rotating element RM2 is rotated as a unit with the input shaft 22 while rotation of the first rotating element RM1 is stopped, the third rotating element RM3 is rotated at a speed denoted by "7$^{th}$", so that the 7$^{th}$-speed gear stage having a smaller gear ratio than that of the 6$^{th}$-speed gear stage is established. Also, when the second clutch C2 and the second brake B2 are engaged, the first rotating element RM1 is rotated at a reduced speed via the sub-transmitting portion 52, and rotation of the second rotating element RM2 is stopped. As a result, the third rotating element RM3 is rotated in the reverse direction at a speed denoted by "Rev" in FIG. 2, so that a reverse gear stage "Rev" is established.

The transmission gear ratios of the respective gear stages are suitably determined depending upon the respective gear ratios ρ1, ρ2 and ρ3 of the first, second and third planetary gear sets 54, 16 and 18. For example, if ρ1 is equal to 0.580, ρ2 is equal to 0.550, and ρ3 is equal to 0.392, the gear ratios as indicated in FIG. 7b are provided, where the step value of the gear ratios is generally appropriate and the total width of the gear ratios (=4.453/0.645) is a sufficiently large value (which is about 6.902). In addition, the reverse gear stage "Rev" has an appropriate gear ratio. Thus, the automatic transmission 50 provides appropriate speed-change characteristics over the entire range of operation.

With the automatic transmission 50 of the embodiment, the seven forward speeds (or forward-drive gear stages) are provided by three planetary gear sets 54, 16, 18, four clutches C1–C4 and two brakes B1, B2. Thus, the automatic transmission 50 is made light-weight and compact, and can be more easily installed on the vehicle, as compared with the case where four planetary gear sets are used. Furthermore, since shifting from one speed to another speed is effected only by changing the combination of two of the clutches C1–C4 and the brakes B1, B2, shift control can be easily performed, and shift shocks are advantageously reduced.

Further, when the gear ratios ρ1, ρ2 and ρ3 of the three planetary gear sets 54, 16 and 18 are respectively set within a range of about 0.3 to 0.6, the automatic transmission 50 is able to provide appropriate speed-change characteristics over the entire range of operation as shown in FIG. 7b while keeping the size (or diameter) of the planetary gear sets 54, 16, 18 relatively small.

Figure 9:
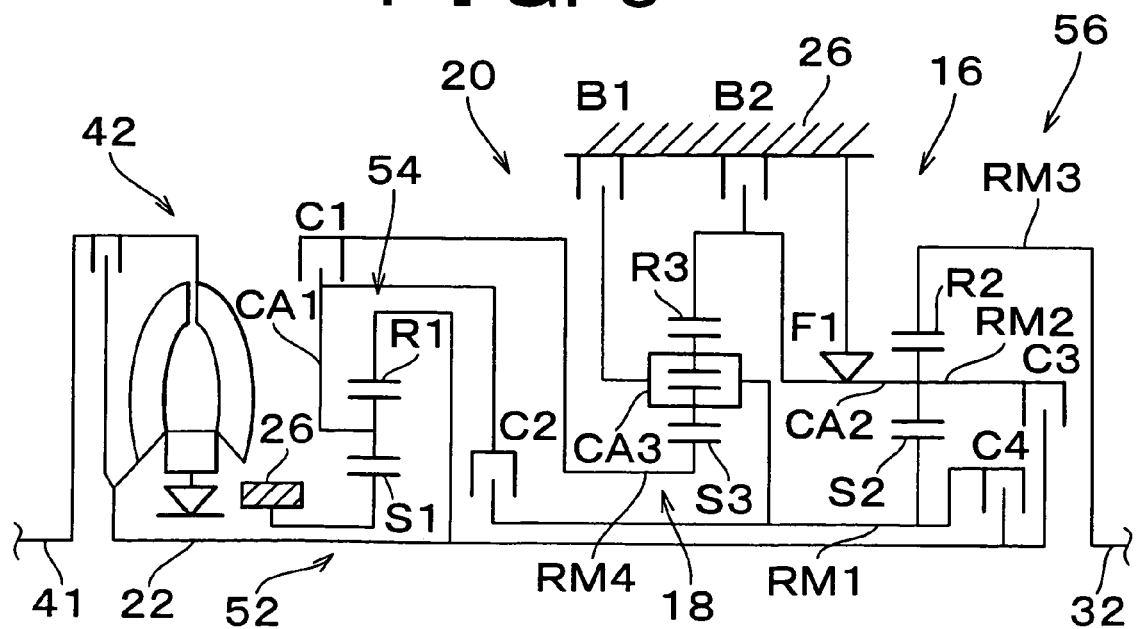
FIG. 9 is a schematic view showing a modified example of the automatic transmission of a motor vehicle according to the third embodiment of the invention.

Besides, FIG. 9 shows an automatic transmission 56 of a motor vehicle as a modified example of the automatic transmission 50 of the third embodiment. In the automatic transmission 56, positions of the second planetary gear set 16 and the third planetary gear set 18 of the main transmitting portion 20 are interchanged.

Fourth Embodiment

Figures 10A, 10B:
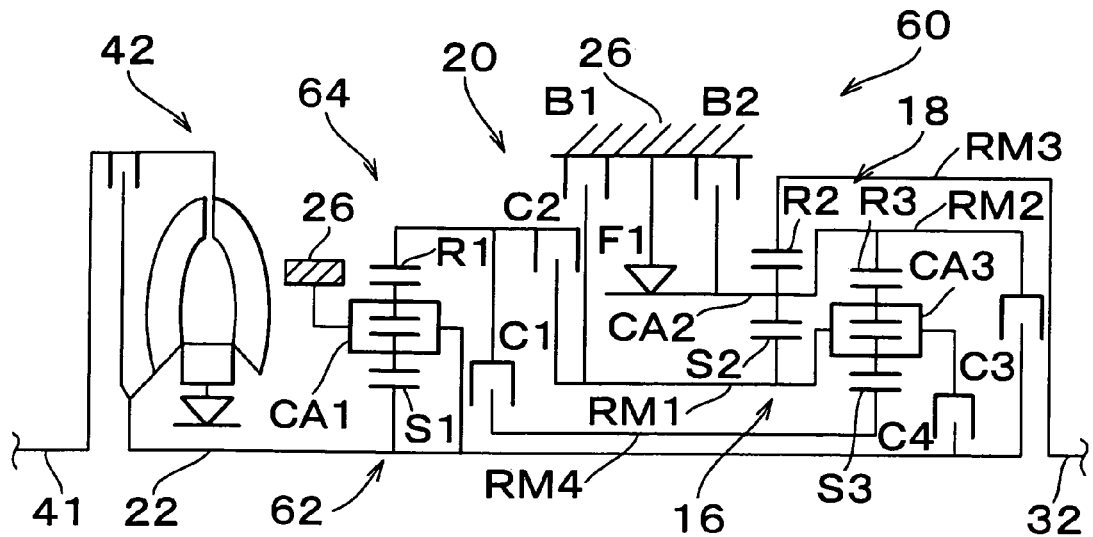
FIG. 10a is a schematic view showing an automatic transmission of a motor vehicle according to a fourth embodiment of the invention.
FIG. 10b is an operation table according to which each gear stage of the automatic transmission of the fourth embodiment is established.
Figure 11:
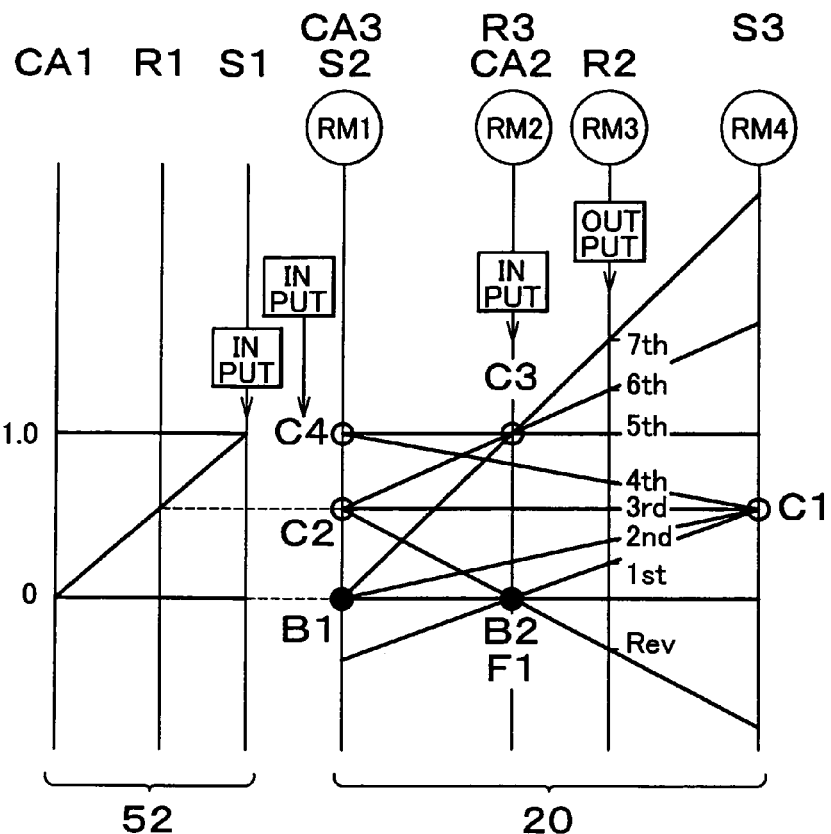
FIG. 11 is a nomogram plotted with respect to the automatic transmission of the fourth embodiment.

FIG. 10a is a schematic view showing an automatic transmission 60 of a motor vehicle according to the fourth embodiment of the invention. FIG. 10b is an operation table useful for explaining the relationship between engaging elements and gear ratios when a plurality of gear stages are established. FIGS. 10a, 10b, and 11 correspond to FIGS. 1a, 1b, and 2, respectively.

The automatic transmission 60 is different from the automatic transmission 50 shown in FIGS. 7a, 7b, and FIG. 8 in respect of the construction of the sub-transmitting portion 62. More specifically, the sub-transmitting portion 62 mainly includes the first planetary gear set 64 of a double pinion type, in which the sun gear S1 is coupled to and rotated by the input shaft 22, and the carrier CA1 is fixed to the case 26 and is thus inhibited from rotating, while the ring gear R1, serving as an intermediate output member, is rotated at a reduced speed as compared with that of the input shaft 22, to output power to the main transmitting portion 20 via the clutch C1 and/or the clutch C2. Namely, the construction of the sub-transmitting portion 62 is identical to that of the sub-transmitting portion 14 of the automatic transmission shown in FIG. 1.

In this case, too, seven forward gear stages, i.e., the 1$^{st}$-speed gear stage through the 7$^{th}$-speed gear stage, and one reverse gear stage "Rev" are established according to the operation table of FIG. 10B that is identical with that of FIG. 7b. The transmission gear ratios of the respective gear stages are suitably determined depending upon the respective gear ratios ρ1, ρ2 and ρ3 of the first, second and third planetary gear sets 64, 16 and 18. For example, if ρ1 is equal to 0.630, ρ2 is equal to 0.550, and ρ3 is equal to 0.392, the same gear ratios as indicated in FIG. 7b are provided. Thus, the automatic transmission 60 of the fourth embodiment operates in substantially the same manner and yields substantially the same effects as that of the third embodiment.

Figure 12:
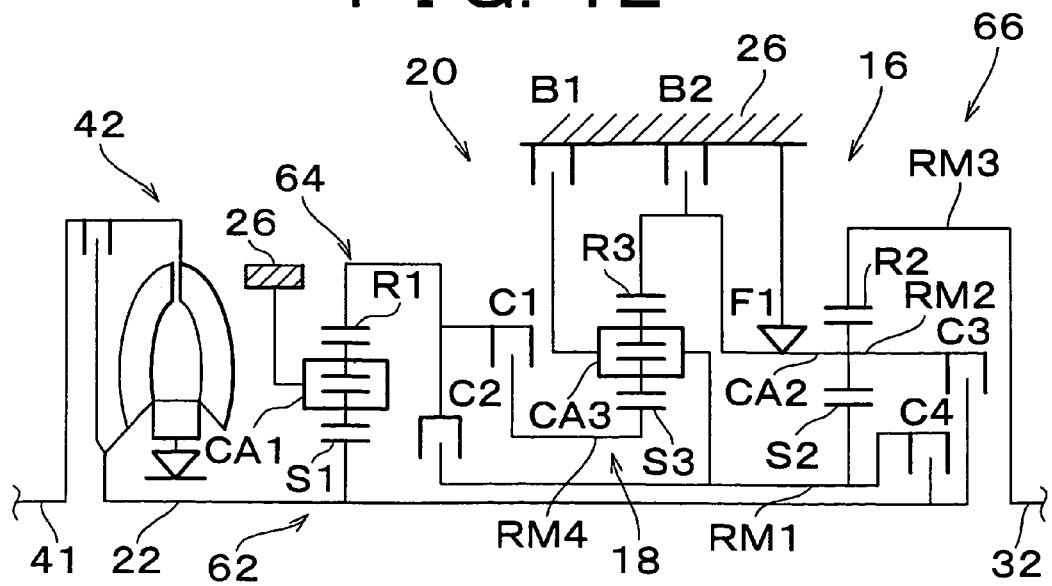
FIG. 12 is a schematic view showing a modified example of the automatic transmission of a motor vehicle according to the fourth embodiment of the invention.

Besides, FIG. 12 shows an automatic transmission 66 of a motor vehicle as a modified example of the automatic transmission 60 of the fourth embodiment. In the automatic transmission 66, positions of the second planetary gear set 16 and the third planetary gear set 18 of the main transmitting portion 20 are interchanged.

Fifth Embodiment

Figures 13A, 13B:
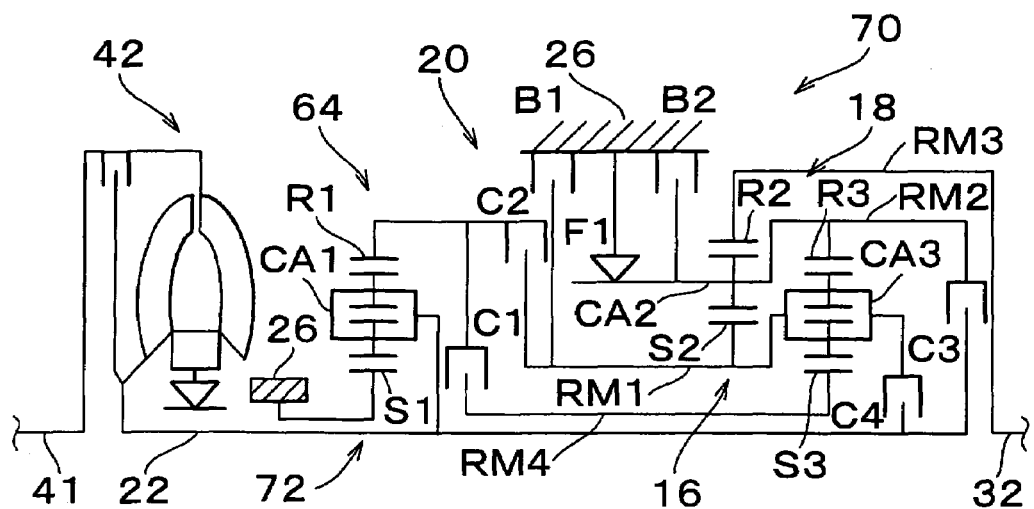
FIG. 13a is a schematic view showing an automatic transmission of a motor vehicle according to a fifth embodiment of the invention.
FIG. 13b is an operation table according to which each gear stage of the automatic transmission of the fifth embodiment is established.
Figure 14:
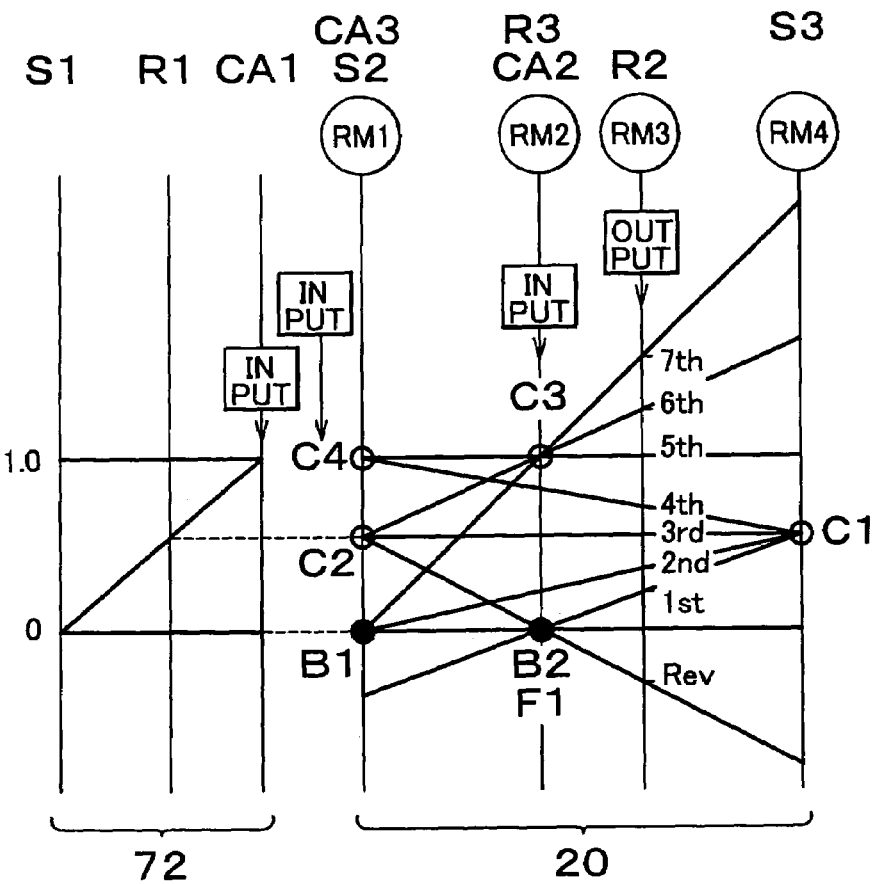
FIG. 14 is a nomogram plotted with respect to the automatic transmission of the fifth embodiment.

FIG. 13a is a schematic view showing an automatic transmission 70 of a motor vehicle according to the fifth embodiment of the invention. FIG. 13b is an operation table useful for explaining the relationship between engaging elements and gear ratios when a plurality of gear stages are established. FIGS. 13a, 13b and 14 correspond to FIGS. 1a, 1b, and 2, respectively.

The automatic transmission 70 is different from the automatic transmission 60 shown in FIGS. 10a, 10b and FIG. 11 in respect of the construction of the sub-transmitting portion 72. More specifically, he carrier CA1 of the first planetary gear set 64 is coupled to and rotated by the input shaft 22, and the sun gear S1 is fixed to the case 26 and is thus inhibited from rotating, while the ring gear R1, serving as an intermediate output member, is rotated at a reduced speed as compared with that of the input shaft 22, to output power to the main transmitting portion 20 via the clutch C1 and/or the clutch C2.

In this case, too, seven forward gear stages, i.e., the 1$^{st}$-speed gear stage through the 7$^{th}$-speed gear stage, and one reverse gear stage "Rev" are established according to the operation table of FIG. 13B that is identical with that of FIG. 7b. The transmission gear ratios of the respective gear stages are suitably determined depending upon the respective gear ratios ρ, ρ2 and ρ3 of the first, second and third planetary gear sets 64, 16 and 18. For example, if ρ1 is equal to 0.370, ρ2 is equal to 0.550, and ρ3 is equal to 0.392, the same gear ratios as indicated in FIG. 10b are obtained. Thus, the automatic transmission 70 of the fifth embodiment operates in substantially the same manner and yields substantially the same effects as that of the forth embodiment.

Figure 15:
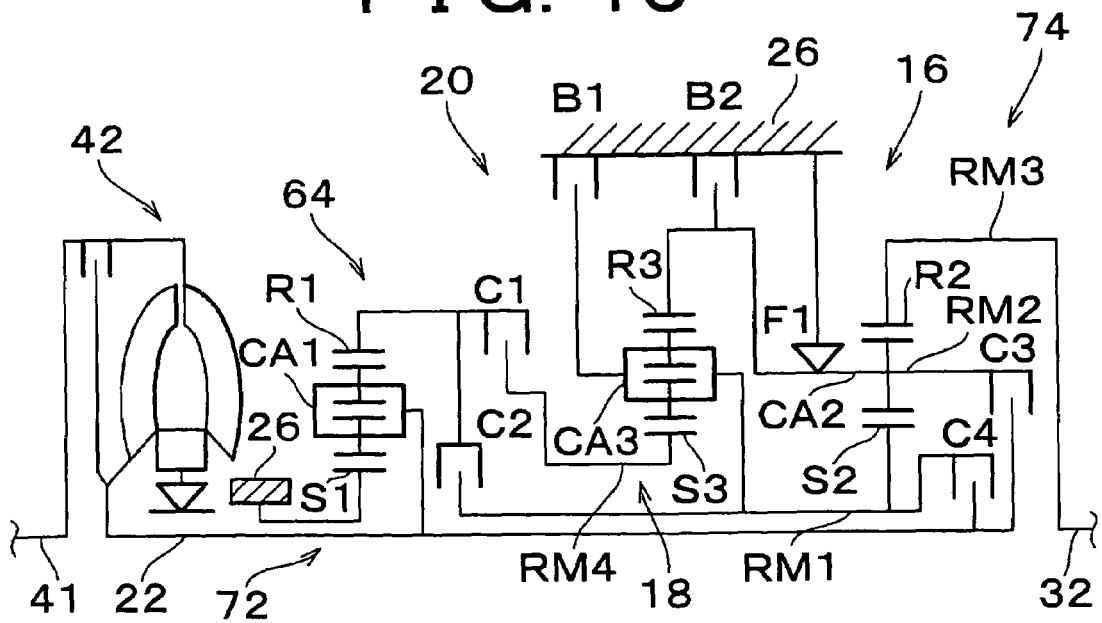
FIG. 15 is a schematic view showing a modified example of the automatic transmission of a motor vehicle according to the fifth embodiment of the invention.

Besides, FIG. 15 shows an automatic transmission 74 of a motor vehicle as a modified example of the automatic transmission 70 of the fifth embodiment. In the automatic transmission 74, positions of the second planetary gear set 16 and the third planetary gear set 18 of the main transmitting portion 20 are interchanged.

In each of the automatic transmissions of the first to fifth embodiments describe above, the first planetary gear set is provided in the first transmitting portion. In place of the first planetary gear set, however, various other deceleration devices or mechanisms may be used such as a biaxial deceleration mechanism including a counter gear or gears.

Further, the positional relationship between first and second transmitting portions and the positional relationship between second and third planetary gear sets of the second transmitting portion are not particularly limited to those of the above-described embodiments, but may be changed as needed. For example, the third planetary gear set may be disposed between the first planetary gear set and the second planetary gear set. The clutches and brakes may also be arranged in various fashions. For example, the clutches and brakes may be arranged to be concentrated in one end portion of the automatic transmission.

In each of the automatic transmissions of the first to fifth embodiments describe above, moreover, the second planetary gear set is of a single pinion type while the third planetary gear set is of a double pinion type. However, for example, these gear sets may both be of a single pinion type or of a double pinion type. Also, coupling constructions of the respective rotating elements of the two planetary gear sets may be modified as needed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An automatic transmission, comprising:
    an input member;
        an output member;
        a first transmitting portion including the input member that is rotated at reduced speed to output power from an intermediate output member, and
        a second transmitting portion including a second planetary gear set and a third planetary gear set each of which includes a sun gear, a carrier and a ring gear, at least one of the sun gear, the carrier and the ring gear of the second planetary gear set being coupled to at least one of the sun gear, the carrier and the ring gear of the third planetary gear set to provide a first rotating element, a second rotating element, a third rotating element and a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the first rotating elements to the input member, the third rotating element being integrally coupled to the output member to output rotary power,
        wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, and a fourth-speed gear stage having a smaller gear ratio than that of the third-speed gear stage is established when the first clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, a seventh-speed gear stage having a smaller gear ratio than that of the sixth-speed gear stage is established when the third clutch and the first brake are engaged.

2. The automatic transmission according to claim 1, wherein:
    the first transmitting portion includes a first planetary gear set having a sun gear, a carrier, and a ring gear, one of the sun gear, the carrier, and the ring gear being coupled to and rotated by the input member, another being fixed and inhibited from rotating, a remaining one serving as an intermediate output member and rotating at a reduced speed as compared with that of the input member to output power to the second transmitting portion.

3. The automatic transmission according to claim 2, wherein:
    the third planetary gear set is disposed between the first planetary gear set and the second planetary gear set as viewed in an axial direction of the automatic transmission.

4. The automatic transmission according to claim 3, wherein:
    the first planetary gear set is of a double pinion type; and
    one of the sun gear and the carrier is coupled to the input member, and the other is fixed and inhibited from rotating, while the ring gear serving as the intermediate output member is rotated at a reduced speed as compared with that of the input member to output power to the second transmitting portion.

5. The automatic transmission according to claim 3, wherein:
    the first planetary gear set is of a single pinion type; and
    one of the sun gear and the ring gear is coupled to the input member, and the other is fixed and inhibited from rotating, while the carrier serving as the intermediate output member is rotated at a reduced speed as compared with that of the input member to output power to the second transmitting portion.

6. The automatic transmission according to claim 2, wherein:
    the second planetary gear set is disposed between the first planetary gear set and the third planetary gear set as viewed in an axial direction of the automatic transmission.

7. The automatic transmission according to claim 6, wherein:
    the first planetary gear set is of a double pinion type; and
    one of the sun gear and the carrier is coupled to the input member, and the other is fixed and inhibited from rotating, while the ring gear serving as the intermediate output member is rotated at a reduced speed as compared with that of the input member to output power to the second transmitting portion.

8. The automatic transmission according to claim 6, wherein:

the first planetary gear set is of a single pinion type; and one of the sun gear and the ring gear is coupled to the input member, and the other is fixed and inhibited from rotating, while the carrier serving as the intermediate output member is rotated at a reduced speed as compared with that of the input member to output power to the second transmitting portion.

9. The automatic transmission according to claim 2, wherein:

the second planetary gear set is of a single pinion type, and the third planetary gear set is of a double pinion type; and the first rotating element comprises the sun gear of the second planetary gear set and the carrier of the third planetary gear set that are coupled to each other, the second rotating element comprises the carrier of the second planetary gear set and the ring gear of the third planetary gear set that are coupled to each other, the third rotating element comprises the ring gear of the second planetary gear set, and the fourth rotating element comprises the sun gear of the third planetary gear set.

10. The automatic transmission according to claim 1, wherein:

the second planetary gear set is of a single pinion type, and the third planetary gear set is of a double pinion type; and the first rotating element comprises the sun gear of the second planetary gear set and the carrier of the third planetary gear set that are coupled to each other, the second rotating element comprises the carrier of the second planetary gear set and the ring gear of the third planetary gear set that are coupled to each other, the third rotating element comprises the ring gear of the second planetary gear set, and the fourth rotating element comprises the sun gear of the third planetary gear set.

* * * * *